US012585143B2

(12) United States Patent
Rehfeldt et al.

(10) Patent No.: US 12,585,143 B2
(45) Date of Patent: Mar. 24, 2026

(54) SAFETY EYEWEAR WITH HEATED LENSES

(71) Applicant: Milwaukee Electric Tool Corporation, Brookfield, WI (US)

(72) Inventors: Alan J. Rehfeldt, Oak Creek, WI (US); Beth E. Cholst, Wauwatosa, WI (US); Jordan A. Rimmer, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 788 days.

(21) Appl. No.: 17/752,485

(22) Filed: May 24, 2022

(65) Prior Publication Data

US 2022/0342236 A1 Oct. 27, 2022

Related U.S. Application Data

(63) Continuation of application No. PCT/US2022/026135, filed on Apr. 25, 2022.

(60) Provisional application No. 63/193,980, filed on May 27, 2021, provisional application No. 63/179,800, filed on Apr. 26, 2021.

(51) Int. Cl.
*G02C 11/08* (2006.01)

(52) U.S. Cl.
CPC ................................... *G02C 11/08* (2013.01)

(58) Field of Classification Search
CPC ...................................................... G02C 11/08
USPC .......................................................... 351/62
See application file for complete search history.

(56) References Cited

U.S. PATENT DOCUMENTS

| | | |
|---|---|---|
| 2,662,835 A | 12/1953 | Reid |
| 3,310,518 A | 3/1967 | Maloney |
| 3,323,889 A | 6/1967 | Carl et al. |
| 3,363,987 A | 1/1968 | Hayes |
| 3,368,915 A | 2/1968 | Steigelman et al. |
| 3,398,182 A | 8/1968 | Guenthner et al. |
| 3,484,281 A | 12/1969 | Guenthner et al. |
| 3,527,711 A | 9/1970 | Barber et al. |
| 3,634,711 A | 1/1972 | Barber et al. |
| 3,855,144 A | 12/1974 | Barber et al. |
| 3,935,119 A | 1/1976 | Barber et al. |
| 3,950,588 A | 4/1976 | McDougal et al. |
| 3,998,644 A | 12/1976 | Lodge eta l. |
| 4,042,749 A | 8/1977 | Sandvig et al. |
| 4,049,861 A | 9/1977 | Nozari et al. |
| 4,069,368 A | 1/1978 | Deyak et al. |

(Continued)

FOREIGN PATENT DOCUMENTS

| | | |
|---|---|---|
| WO | WO94/07175 | 3/1994 |
| WO | WO 2013/096449 | 6/2013 |

OTHER PUBLICATIONS

"Optically Clear Heaters with KODAK™ Highly Conductive HCF film/Estar base," Thermo Heating Elements, LLC, available at least as early as Apr. 23, 2021, 1 page.

(Continued)

*Primary Examiner* — Sharrief I Broome
(74) *Attorney, Agent, or Firm* — Reinhart Boerner Van Deuren s.c.

(57) ABSTRACT

One or more safety eyewear devices are described. The safety eyewear includes a heating element that transfers heat to lenses, thereby providing defogging in eyewear suitable for a construction environment.

13 Claims, 4 Drawing Sheets

(56)　　　　　　References Cited

U.S. PATENT DOCUMENTS

| | | | |
|---|---|---|---|
| 4,073,967 A | | 2/1978 | Sandvig et al. |
| 4,082,896 A | | 4/1978 | Wegwerth et al. |
| 4,084,021 A | | 4/1978 | Sandvig et al. |
| 4,088,810 A | | 5/1978 | Lodge et al. |
| 4,100,134 A | | 7/1978 | Robins et al. |
| 4,100,309 A | | 7/1978 | Micklus et al. |
| 4,118,536 A | | 10/1978 | Beardsley et al. |
| 4,119,094 A | | 10/1978 | Micklus et al. |
| 4,130,690 A | | 12/1978 | Lien et al. |
| 4,152,165 A | | 5/1979 | Langager et al. |
| 4,156,046 A | | 5/1979 | Lien et al. |
| 4,168,332 A | | 9/1979 | Leinen et al. |
| 4,181,766 A | | 1/1980 | Williams et al. |
| 4,190,321 A | | 2/1980 | Dorer et al. |
| 4,209,234 A | * | 6/1980 | McCooeye ............ G02C 11/08 219/522 |
| 4,235,638 A | | 11/1980 | Beck et al. |
| 4,249,011 A | | 2/1981 | Wendling et al. |
| 4,252,843 A | | 2/1981 | Dorer et al. |
| 4,262,072 A | | 4/1981 | Wendling et al. |
| 4,267,213 A | | 5/1981 | Beck et al. |
| 4,309,516 A | | 1/1982 | Schultz et al. |
| 4,338,377 A | | 7/1982 | Beck et al. |
| 4,362,785 A | | 12/1982 | Schultz et al. |
| 4,463,114 A | | 7/1984 | Balchunis et al. |
| 4,467,073 A | | 8/1984 | Creasy |
| 4,532,185 A | | 7/1985 | Balchunis et al. |
| 4,544,572 A | | 10/1985 | Sandvig et al. |
| 4,587,169 A | | 5/1986 | Kistner |
| 4,619,949 A | | 10/1986 | Kistner |
| 4,650,845 A | | 3/1987 | Hegel |
| 4,740,577 A | | 4/1988 | DeVoe et al. |
| 4,758,448 A | | 7/1988 | Sandvig et al. |
| 4,781,978 A | | 11/1988 | Duan |
| 4,785,064 A | | 11/1988 | Hegel |
| 4,873,139 A | | 10/1989 | Kinosky |
| 4,885,332 A | | 12/1989 | Bilkadi |
| 4,942,629 A | * | 7/1990 | Stadlmann ............ G02C 11/08 2/435 |
| 4,971,697 A | | 11/1990 | Douden et al. |
| 5,013,608 A | | 5/1991 | Guest et al. |
| 5,102,695 A | | 4/1992 | Guest et al. |
| 5,104,632 A | | 4/1992 | Douden et al. |
| 5,104,929 A | | 4/1992 | Bilkadi et al. |
| 5,227,185 A | | 7/1993 | Gobran et al. |
| 5,236,968 A | | 8/1993 | Hirschmann et al. |
| 5,241,006 A | | 8/1993 | Iqbal et al. |
| 5,300,558 A | | 4/1994 | Kurisu et al. |
| 5,314,947 A | | 5/1994 | Watanabe et al. |
| 5,316,791 A | | 5/1994 | Farber et al. |
| 5,363,153 A | * | 11/1994 | Bailiff .................... G02C 11/00 351/158 |
| 5,367,019 A | | 11/1994 | Sawaragi et al. |
| 5,376,727 A | | 12/1994 | Iqbal et al. |
| 5,381,192 A | * | 1/1995 | Canavan .................. G02C 5/20 351/111 |
| 5,382,451 A | | 1/1995 | Johnson et al. |
| 5,575,878 A | | 11/1996 | Cox et al. |
| 5,585,186 A | | 12/1996 | Scholz et al. |
| 5,585,407 A | | 12/1996 | Patel et al. |
| 5,608,003 A | | 3/1997 | Zhu et al. |
| 5,677,050 A | | 10/1997 | Bilkadi et al. |
| 5,693,390 A | | 12/1997 | Inagaki et al. |
| 5,694,650 A | | 12/1997 | Hong |
| 5,723,175 A | | 3/1998 | Scholz et al. |
| 5,753,373 A | | 5/1998 | Scholz et al. |
| 5,760,126 A | | 6/1998 | Engle et al. |
| 5,789,459 A | | 8/1998 | Inagaki et al. |
| 5,798,409 A | | 8/1998 | Ho et al. |
| 5,805,258 A | | 9/1998 | Wiedner |
| 5,817,376 A | | 10/1998 | Everaerts et al. |
| 5,846,650 A | | 12/1998 | Ko et al. |
| 5,866,262 A | | 2/1999 | Galic |
| 5,873,931 A | | 2/1999 | Scholz et al. |
| 5,877,254 A | | 3/1999 | La Casse et al. |
| 5,888,290 A | | 3/1999 | Engle et al. |
| 5,914,162 A | | 6/1999 | Bilkadi et al. |
| 5,939,182 A | | 8/1999 | Huang et al. |
| 5,958,514 A | | 9/1999 | Havey et al. |
| 5,962,546 A | | 10/1999 | Everaerts et al. |
| 5,981,113 A | | 11/1999 | Christian et al. |
| 5,997,621 A | | 12/1999 | Scholz et al. |
| 6,001,163 A | | 12/1999 | Havey et al. |
| 6,005,043 A | | 12/1999 | Zhu |
| 6,040,053 A | | 3/2000 | Scholz et al. |
| 6,132,860 A | | 10/2000 | Bruxvoort et al. |
| 6,132,861 A | | 10/2000 | Kang et al. |
| 6,177,138 B1 | | 1/2001 | Sawaragi et al. |
| 6,201,056 B1 | | 3/2001 | Zhu et al. |
| 6,217,984 B1 | | 4/2001 | Bruxvoort et al. |
| 6,232,359 B1 | | 5/2001 | Christian eta l. |
| 6,245,833 B1 | | 6/2001 | Kang et al. |
| 6,258,918 B1 | | 7/2001 | Ho et al. |
| 6,265,061 B1 | | 7/2001 | Kang et al. |
| 6,342,097 B1 | | 1/2002 | Terry et al. |
| 6,346,331 B2 | | 2/2002 | Harvey et al. |
| 6,348,269 B1 | | 2/2002 | Terry et al. |
| 6,376,576 B2 | | 4/2002 | Kang et al. |
| 6,420,607 B1 | | 7/2002 | Hamrock et al. |
| 6,440,568 B1 | | 8/2002 | Kayanoki et al. |
| 6,458,462 B1 | | 10/2002 | Kang et al. |
| 6,497,995 B2 | | 12/2002 | Skrobis et al. |
| 6,538,092 B1 | | 3/2003 | Terry et al. |
| 6,649,272 B2 | | 11/2003 | Moore et al. |
| 6,703,131 B1 | | 3/2004 | Kayanoki eta l. |
| 6,709,748 B1 | | 3/2004 | Ho et al. |
| 6,773,104 B2 | | 8/2004 | Cornelius et al. |
| 6,773,108 B2 | | 8/2004 | deRojas et al. |
| 6,773,871 B2 | | 8/2004 | Skrobis et al. |
| 6,878,463 B2 | | 4/2005 | Skrobis et al. |
| 6,995,222 B2 | | 2/2006 | Buckanin et al. |
| 7,001,642 B2 | | 2/2006 | Terry et al. |
| 7,008,979 B2 | | 3/2006 | Schottman et al. |
| 7,014,918 B2 | | 3/2006 | Terry et al. |
| 7,018,463 B2 | | 3/2006 | Terry |
| 7,074,463 B2 | | 7/2006 | Jones et al. |
| 7,097,704 B1 | | 8/2006 | Pae |
| 7,097,910 B2 | | 8/2006 | Moore et al. |
| 7,101,616 B2 | | 9/2006 | Arney et al. |
| 7,105,598 B2 | | 9/2006 | Terry et al. |
| 7,179,513 B2 | | 2/2007 | Jones et al. |
| 7,234,808 B2 | | 6/2007 | Bruck et al. |
| 7,265,179 B2 | | 9/2007 | Jin et al. |
| 7,282,272 B2 | | 10/2007 | Jones et al. |
| 7,289,202 B2 | | 10/2007 | Groess et al. |
| 7,309,517 B2 | | 12/2007 | Jones et al. |
| 7,374,812 B2 | | 5/2008 | Mizuno et al. |
| 7,524,543 B2 | | 4/2009 | Jones et al. |
| 7,547,476 B2 | | 6/2009 | Jones et al. |
| 7,575,731 B2 | | 8/2009 | Iijima et al. |
| 7,622,164 B2 | | 11/2009 | Jones et al. |
| 7,652,116 B2 | | 1/2010 | Clark et al. |
| 7,652,117 B2 | | 1/2010 | Clark et al. |
| 7,713,597 B2 | | 5/2010 | Jones et al. |
| 7,718,219 B2 | | 5/2010 | Mahoney et al. |
| 7,763,331 B2 | | 7/2010 | Jones et al. |
| 7,892,638 B2 | | 2/2011 | Jones et al. |
| 7,957,621 B2 | | 6/2011 | Zhang et al. |
| 7,972,656 B2 | | 7/2011 | Jin et al. |
| 8,012,252 B2 | | 9/2011 | Engler et al. |
| 8,015,970 B2 | | 9/2011 | Klun et al. |
| 8,124,189 B2 | | 2/2012 | Kaiser et al. |
| 8,153,196 B2 | | 4/2012 | Jin et al. |
| 8,153,197 B2 | | 4/2012 | Schneider et al. |
| 8,158,191 B2 | | 4/2012 | Schneider et al. |
| 8,168,271 B2 | | 5/2012 | Jones et al. |
| 8,231,705 B2 | | 7/2012 | Uibel |
| 8,249,409 B2 | | 8/2012 | Zhang et al. |
| 8,354,160 B2 | | 1/2013 | Jing et al. |
| 8,361,599 B2 | | 1/2013 | Jones et al. |
| 8,389,074 B2 | | 3/2013 | Jones et al. |
| 8,461,255 B2 | | 6/2013 | Isobe et al. |
| 8,642,180 B2 | | 2/2014 | Iwazumi et al. |
| 8,664,298 B1 | | 3/2014 | Ou et al. |

(56)                    References Cited

U.S. PATENT DOCUMENTS

| | | | |
|---|---|---|---|
| 8,748,506 B2 | 6/2014 | Jin | |
| 8,853,301 B2 | 10/2014 | Jing et al. | |
| 8,859,040 B2 | 10/2014 | Dodge | |
| 8,968,459 B1 | 3/2015 | Liu | |
| 8,987,352 B1 | 3/2015 | Ou et al. | |
| 9,006,370 B1 | 4/2015 | Liu et al. | |
| 9,034,464 B2 | 5/2015 | Okazaki | |
| 9,034,489 B2 | 5/2015 | Jing et al. | |
| 9,081,208 B2 | 7/2015 | Blum et al. | |
| 9,085,019 B2 | 7/2015 | Zhang et al. | |
| 9,181,451 B2 | 11/2015 | Chen et al. | |
| 9,206,335 B2 | 12/2015 | Hager et al. | |
| 9,238,769 B2 | 1/2016 | Okazaki | |
| 9,382,441 B2 | 7/2016 | Liang et al. | |
| 9,400,343 B1 | 7/2016 | Pethuraja et al. | |
| 9,556,338 B2 | 1/2017 | Jing et al. | |
| 9,631,120 B2 | 4/2017 | Iwazumi et al. | |
| 9,657,194 B2 | 5/2017 | Chen et al. | |
| 9,696,318 B2 | 7/2017 | Chen et al. | |
| 9,829,604 B2 | 11/2017 | Schmidt et al. | |
| 9,902,869 B2 | 2/2018 | Schmidt et al. | |
| RE46,761 E | 3/2018 | Ho et al. | |
| 9,925,560 B2 | 3/2018 | Armstrong et al. | |
| 9,993,948 B2 | 6/2018 | Zhang et al. | |
| 10,040,953 B2 | 8/2018 | Riddle et al. | |
| 10,048,408 B2 | 8/2018 | Lu et al. | |
| 10,208,190 B2 | 2/2019 | Jing et al. | |
| 10,213,993 B2 | 2/2019 | Chen-Ho et al. | |
| 10,221,331 B2 | 3/2019 | Deshpande et al. | |
| 10,241,237 B2 | 3/2019 | Jing et al. | |
| 10,281,617 B1 | 5/2019 | Pethuraja et al. | |
| 10,293,449 B2 | 5/2019 | Schlechte et al. | |
| 10,297,698 B2 | 5/2019 | Chu et al. | |
| 10,316,212 B2 | 6/2019 | Jing et al. | |
| 10,336,650 B2 | 7/2019 | Brown et al. | |
| 10,428,194 B2 | 10/2019 | Okazaki et al. | |
| 10,508,202 B2 | 12/2019 | Jing et al. | |
| 10,520,647 B2 | 12/2019 | Zhu et al. | |
| 10,613,353 B2 | 4/2020 | Tang et al. | |
| 10,723,888 B2 | 7/2020 | Jing et al. | |
| 10,745,581 B2 | 8/2020 | Deshpande et al. | |
| 10,807,907 B2 | 10/2020 | Bertran Serra et al. | |
| 10,883,014 B2 | 1/2021 | Jang et al. | |
| 2002/0041437 A1 | 4/2002 | Cornelius | |
| 2003/0032721 A1 | 2/2003 | Terry et al. | |
| 2004/0075893 A1 | 4/2004 | Cornelius | |
| 2004/0105156 A1 | 6/2004 | Kayanoki | |
| 2004/0142252 A1 | 7/2004 | Skrobis | |
| 2006/0147729 A1 | 7/2006 | Mizuno | |
| 2006/0197906 A1* | 9/2006 | Goodis | G02C 11/08 351/158 |
| 2007/0166344 A1 | 7/2007 | Qu et al. | |
| 2007/0252945 A1* | 11/2007 | Welchel | G02C 11/08 351/62 |
| 2008/0145547 A1 | 6/2008 | Schneider et al. | |
| 2009/0015142 A1 | 1/2009 | Potts et al. | |
| 2009/0025125 A1 | 1/2009 | Jou | |
| 2009/0263668 A1 | 10/2009 | David et al. | |
| 2010/0035039 A1 | 2/2010 | Jing et al. | |
| 2010/0092765 A1 | 4/2010 | Hager et al. | |
| 2010/0221552 A1 | 9/2010 | Ishida et al. | |
| 2012/0040190 A1 | 2/2012 | You et al. | |
| 2012/0052289 A1 | 3/2012 | Jing et al. | |
| 2012/0171403 A1 | 7/2012 | Dodge | |
| 2012/0177928 A1 | 7/2012 | You et al. | |
| 2012/0306236 A1 | 12/2012 | Skipper et al. | |
| 2013/0045387 A1 | 2/2013 | Chu et al. | |
| 2013/0164541 A1 | 6/2013 | Suwa et al. | |
| 2013/0211310 A1 | 8/2013 | Bommarito et al. | |
| 2013/0216784 A1 | 8/2013 | Zhang et al. | |
| 2013/0216820 A1 | 8/2013 | Riddle et al. | |
| 2013/0224478 A1 | 8/2013 | Jing et al. | |
| 2013/0229378 A1 | 9/2013 | Iyer et al. | |
| 2013/0295327 A1 | 11/2013 | Zhang et al. | |
| 2014/0120340 A1 | 5/2014 | Riddle et al. | |
| 2014/0272295 A1 | 9/2014 | Deshpande et al. | |
| 2015/0175479 A1 | 6/2015 | Brown et al. | |
| 2016/0333188 A1 | 11/2016 | Riddle et al. | |
| 2018/0100082 A1 | 4/2018 | Deshpande et al. | |
| 2018/0346734 A1 | 12/2018 | Stollwerck et al. | |
| 2019/0202184 A1 | 7/2019 | Hanawa et al. | |
| 2020/0081159 A1 | 3/2020 | Zhu et al. | |

OTHER PUBLICATIONS

International Search Report and Written Opinion for International Application No. PCT/US2022/026135, dated Aug. 10, 2022, 10 pages.

* cited by examiner

310

344
342
348
346
340

345    343    349    347

SAFETY EYEWEAR WITH HEATED LENSES

CROSS-REFERENCE TO RELATED PATENT APPLICATIONS

The present application is a continuation of International Application No. PCT/US2022/026135, filed Apr. 25, 2022, which claims the benefit of and priority to U.S. Provisional Application No. 63/179,800, filed on Apr. 26, 2021, and U.S. Provisional Application No. 63/193,980, filed on May 27, 2021, each of which is incorporated herein by reference in its entirety.

BACKGROUND OF THE INVENTION

The present disclosure is directed generally to the field of safety eyewear. The present disclosure relates specifically to safety eyewear with heated lenses for use in a construction environment.

SUMMARY OF THE INVENTION

One embodiment of the invention relates to a safety eyewear including a frame configured to couple to a head of a user, a lens coupled to the frame, and a heating element coupled to the frame. The lens is positioned in front of an eye of the user when the user is wearing the safety eyewear. The heating element is configured to convert received electricity into heat, and the heating element is positioned to transfer the heat to the lens to reduce fogging on the lens (e.g., via increasing a temperature of the lens).

Another embodiment of the invention relates to a safety eyewear including a lens positioned in front of an eye of a user when the user is wearing the safety eyewear, and a frame configured to couple to a head of the user. The frame includes a rim coupled to the lens, a first arm coupled to the rim, and a second arm coupled to the rim. The first and second arms are configured to engage with ears of the user to secure the safety eyewear to the head of the user. The safety eyewear further includes a power supply coupled to the first arm, and a heating element electrically coupled to the power supply. The heating element is configured to convert electricity received from the power supply into heat, the heat transferring from the frame to the lens to reduce fogging on the lens.

Another embodiment of the invention relates to a headwear protective system including a safety headwear, a power supply coupled to the safety headwear, a frame, a lens, and a heating element. The safety headwear includes a shell formed from a rigid material, the shell defining an external surface and an opposing internal surface that defines a cavity sized to receive the head of a user. The frame is configured to couple to the head of the user. The frame includes a rim and a plurality of arms coupled to the rim and is configured to engage with ears of the user to secure the frame to the head of the user. The lens is coupled to the rim and positioned in front of an eye of the user. The heating element is configured to receive electricity from the power supply and convert the electricity into heat, the heat transferring from the heating element to the lens to reduce fogging on the lens.

Another embodiment of the invention relates to a safety eyewear including one or more lenses, a heating element associated with the lenses and a power supply. The heating element heats the lenses to reduce fogging. In specific embodiments, the heating element is a resistive heating element that produces heat in response to electric current. In some embodiments, the power supply is a rechargeable battery such as a rechargeable power tool battery, such as a lithium power tool battery.

In some embodiments, the battery is supported by a frame supporting the lenses. In another embodiment, the battery is supported at location separate from the frame, such as on a hard hat, and a power conductor connects the heating element to the battery. In another embodiment, the battery is supported by an article of clothing (such as a battery powering a heated jacket or work coat). In some such embodiments, the frame includes a power coupling or port that engages with a connection portion of the power conductor connected to the power supply.

Another embodiment of the invention relates to safety eyewear including a frame configured to engage with a head of a user, lenses coupled to the frame, and a heating element coupled to the frame. The lenses are positioned in front of an eye of a user when a user is wearing the safety eyewear. The heating element is configured to convert electricity into heat, and the heat transfers from the heating element to the lenses to reduce fogging on the lenses.

In a specific embodiment, the safety eyewear includes a power supply coupled to the frame, and the electricity is received from the power supply. In a specific embodiment, the heating element includes an elongate resistive heating element coupled to the frame. In a specific embodiment, the elongate resistive heating element is wrapped around the frame, and the elongate structure of the heating element interfaces with both the frame and the lenses. In another embodiment, the elongate resistive heating is coupled to or embedded in the lenses.

In a specific embodiment, the heating element includes a resistive coating coated on and/or supported by the lenses. The resistive coating is configured to receive the electricity from the power supply and to convert the electricity into the heat.

Another embodiment of the invention relates to safety eyewear including lenses, a power supply, and a frame coupled to the power supply and the lenses. The lenses are positioned in front of an eye of a user when a user is wearing the safety eyewear. The frame is configured to convert electricity received from the power supply into heat, the heat transferring from the frame to the lenses to reduce fogging on the lenses.

Another embodiment of the invention relates to safety eyewear including a frame configured to couple to a head of a user, a power supply coupled to the frame, and lenses coupled to the frame. The lenses include a heating element between a first abrasion resistant coating and a second abrasion resistant coating. The heating element is electrically coupled to the power supply. The heating element is configured to convert electricity received from the power supply into heat, and the heat transfers from the heating element to the first abrasion resistant coating and the second abrasion resistant coating to reduce fogging on the lenses. The lenses are positioned in front of an eye of a user when a user is wearing the safety eyewear. In some such embodiments, the heating element is formed from an optically clear material, such as a light transmitting, resistive heating coating or polymer lens material.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a safety eyewear with heated lenses are shown. The safety eyewear may be safety glasses, safety googles, a face shield, mask, etc. As shown in the accompanying figures, the lenses of the safety eyewear include a heating element (e.g., a resistive heating element) that heats the lenses to facilitate defogging. In various embodiments, Applicant has developed designs that facilitate use of a heated lenses in a safety eyewear application, include lenses and heating element design and power supply type and support. In various embodiments, the designs discussed herein include innovative concepts and structures for support a heating element and/or a power supply for heating safety eyewear for use in a construction environment.

Figure 1:
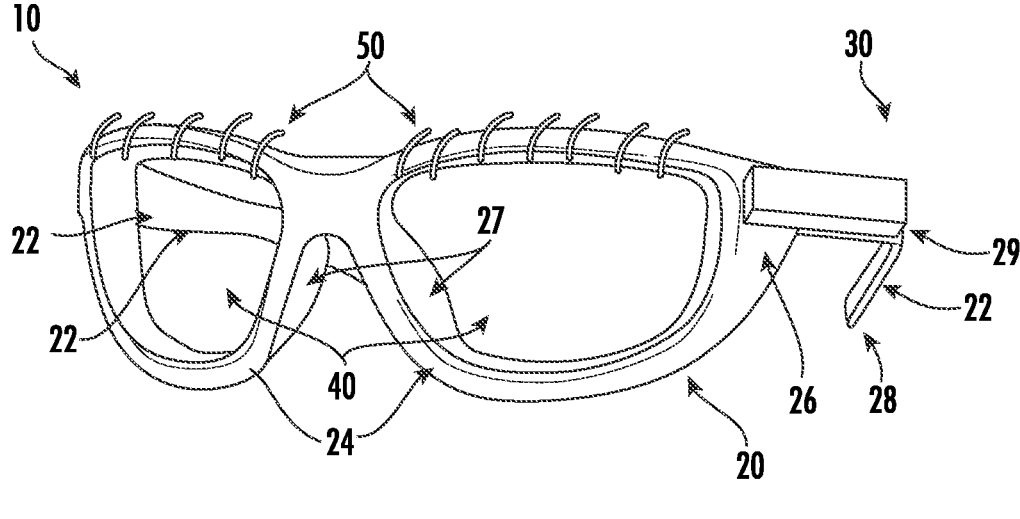
FIG. 1 is a perspective view of heated safety glasses, according to an exemplary embodiment.
Figure 2:
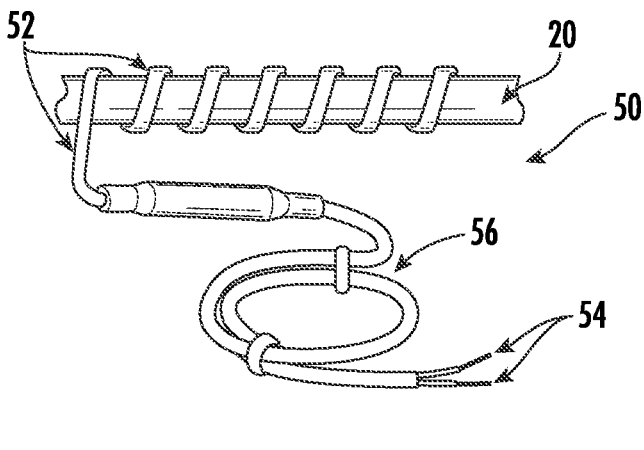
FIG. 2 is a perspective view of the heating element and a portion of the frame of the heated safety glasses of FIG. 1, according to an exemplary embodiment.

Referring to FIGS. 1-2, various aspects of heated safety eyewear, shown as safety glasses 10, with a heating element are shown. Glasses 10 include a frame 20 configured to couple to a head of a user. In general, frame 20 includes frame rim 24 and temple pieces or arms 22 coupled to frame rim 24 via hinges 26. In a specific embodiment, arms 22 of frame 20 are configured to engage with a head of a user to secure glasses 10 to the head of the user. In various embodiments arms 22 include first arm 23 and second arm 29 that are coupled to rim 24 of glasses 10, such as pivotally coupled. One or both of first arm 23 and second arm 29 configured to engage around the ear of a user such as via a curved end opposite rim 24, such as a via hook 28. In various embodiments glasses 10 include a nose piece 27, such as a projection, coupled to and extending from an inner portion of rim 24, and nose piece 27 is configured to engage against and rest on a nose of a user when glasses 10 are being worn.

In the embodiment shown, a power supply, shown as power supply 30, is supported by and physically coupled to frame 20. Power supply 30 is electrically coupled to heating element 50 and provides electricity to heating element 50. Glasses 10 also include one or more lenses 40, such as two lenses 40, supported by and at least partially surrounded by frame rim 24.

Applicant has developed a variety of different innovative designs that allow for support of a battery via frame 20 and/or another piece of equipment commonly used in a construction environment. In the specific embodiment shown, power supply 30 is supported by and may be located within one of arms 22 of frame 20 (e.g., power supply 30 is coupled to first arm 23). In some such embodiments, power supply 30 is located within the temple portion of arms 22. In another embodiment, power supply 30 is supported from rim 24. In another embodiment, glasses 10 includes multiple batteries supported from frame 20.

In a specific embodiment, power supply 30 is a rechargeable battery, such as a rechargeable power tool battery, such as a lithium power tool battery. In a specific embodiment, power supply 30 is a Redlithium® battery available from Milwaukee Tool. In a specific embodiment, power supply 30 is selected from the group consisting of an AA and an AAA battery, which is located within at least one arm 22 (e.g., first arm 23). In various embodiments, power supply 30 is a rechargeable power tool battery.

Lenses 40 are configured to provide a protective cover over an eye of the user wearing glasses 10. Lenses 40 are positioned in front of an eye of a user when a user is wearing glasses 10. In various embodiments, lenses 40 are formed from a durable, shatter resistant material suitable of providing protection to the eyes of a user in a construction setting.

A heating element 50 is physically coupled to frame 20 and electrically coupled to power supply 30. Heating element 50 is configured to convert electricity, such as electricity received from power supply 30, into heat. The heat is transferred from heating element 50 to lenses 40 to reduce fogging (e.g., condensation) on lenses 40. Stated another way, heating element 50 is positioned to transfer the heat to the lenses 40 to increase a temperature of lenses 40 and thereby reduce fogging on the lenses 40.

In various embodiments heating element 50 includes an elongate flexible structure, shown as resistive heating wire 52, coupled to frame 20, such as being wrapper around frame 20. In a specific embodiment, one or more power connectors 54 electrically couple to power supply 30. A power conductor, shown as cord 56, electrically couples power connectors 54 to resistive heating wire 52. Resistive heating wire 52 receives electricity from power supply 30 via cord 56 and converts the electricity to heat that is transferred to lenses 40.

In a specific embodiment, resistive heating wire 52 is wrapped around frame 20. In this embodiment, resistive heating wire 52 of heating element 50 interfaces with both frame 20 and lenses 40. In this manner, heat generated by wire 52 is conducted both directly into lenses 40 and into portions of frame 20. An electrical input 58 is electrically coupled to the heating element 50, and the electrical input 58 is configured to receive the electricity from the power supply 30 and provide the electricity to the heating element 50. In various embodiments, the electrical input 58 is configured to be coupled to an external power source, such as a power source not coupled to frame 20 (e.g., a power source coupled to a hard hat the user is wearing).

Figure 3:
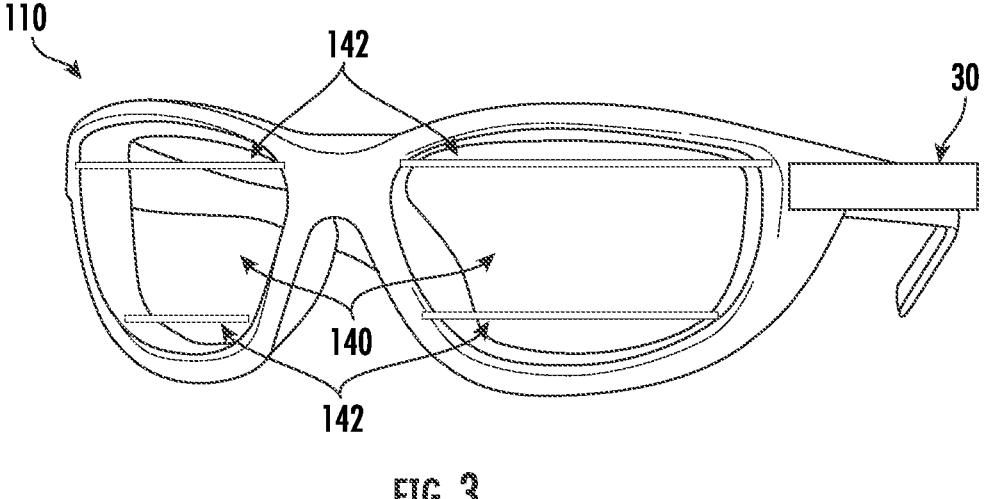
FIG. 3 is a perspective view of heated safety glasses, according to another exemplary embodiment.

Referring to FIG. 3, glasses 110 are shown according to an exemplary embodiment. Glasses 110 are substantially the same as glasses 10 except for the differences discussed herein.

Glasses 110 includes an electrically-resistive material, shown as one or more heating element 142, supported by or embedded in lenses 140. In a specific embodiment, heating element 142 is one or more strips or layers of electrically conductive paint coated to lenses 140. Heating element 142 is electrically coupled to power supply 30. In a specific embodiment, heating element 142 is applied to lenses 140 in multiple distinct elongate coatings (e.g., elongate strips) that traverse lenses 140, such as four elongate coating strips that extend in a horizontal direction across lenses 140. In such embodiments, an electrical coupling and electrical conductor is supported on or within frame 20 to connect heating element 142 to power supply 30.

Figure 4:
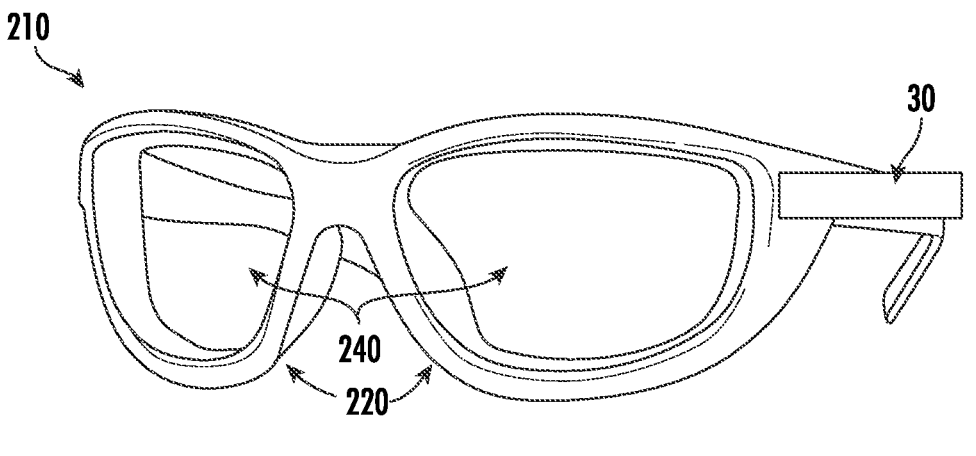
FIG. 4 is a perspective view of heated safety glasses, according to another exemplary embodiment.

Referring to FIG. 4, glasses 210 is shown according to an exemplary embodiment. Glasses 210 is substantially the same as glasses 10 except for the differences discussed herein.

Frame 220 is an electrically conductive material, such as metal. Frame 220 is electrically coupled to power supply 30. Frame 220 receives electricity from power supply 30 and converts the electricity to heat, which is transferred to lenses 240. Thus in this embodiment, frame itself 220 acts as the electrically resistive heating element. Stated another way, frame 220 is configured to receive electricity and convert the electricity to heat that is transferred to the lenses 240. In a specific embodiment, rim 224 of frame 220 is configured to receive electricity and convert the electricity to heat that is transferred to the lenses 240, and the other components of frame 220 (e.g., arms 222) are not configured to receive electricity that is converted to heat.

Figure 5:
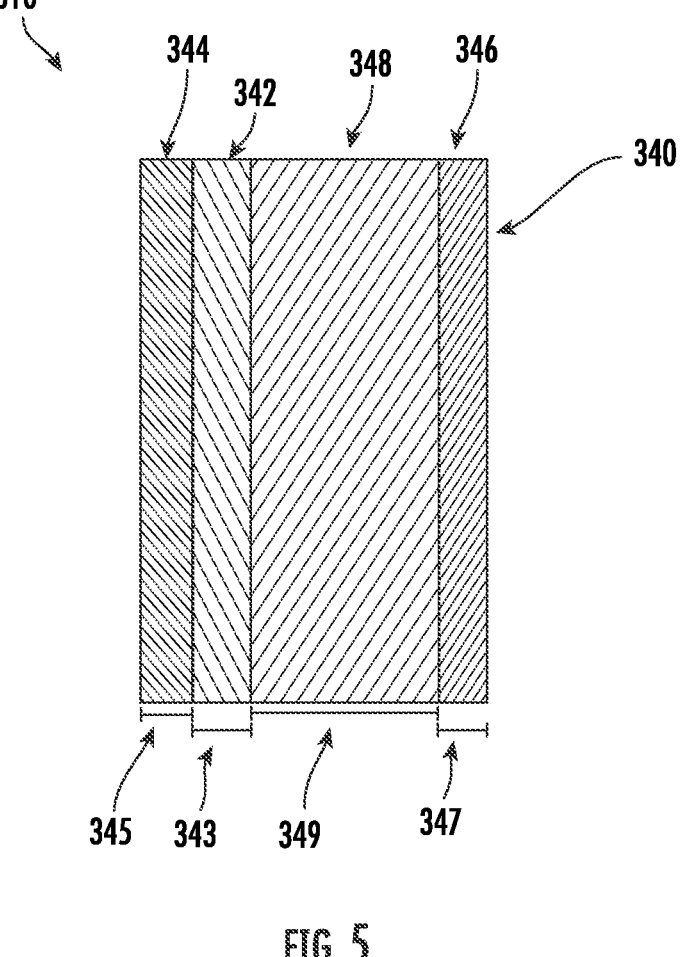
FIG. 5 is a cross-section of a lens of a heated safety eyewear, according to another exemplary embodiment.

Referring to FIG. 5, lenses 340 is shown according to an exemplary embodiment. In general, lenses 340 includes an embedded resistive heating element. As will be understood, lenses 340 may be used as the lenses for any of the glasses embodiments discussed herein. In some such embodiments, the heated safety glasses include both lenses 340 and one or more of the other resistive heating elements discussed above, and in other embodiments, glasses may include only lenses 340 such that the only heating element is the embedded resistive heating element discussed below.

In a specific embodiment, lenses 340 includes four layers. Lenses 340 includes a first protective layer, shown as first abrasion resistant coating 344, that protects heating element 342 from physical damage. Lenses 340 includes a second protective layer similar to the first protective layer, shown as second abrasion resistant coating 346 that protects a transparent body 348, which supports heating element 342. In various embodiments, body 348 is formed from a shatter-resistant material.

First abrasion resistant coating 344 defines thickness 345, and second abrasion resistant coating 346 defines thickness 347. In a specific embodiment, thickness 345 and/or thickness 347 is between 3 μm and 5 μm.

Body 348 defines thickness 349. In a specific embodiment, thickness 349 is between 1 mm and 2 mm, and more specifically is 1.5 mm.

Heating element 342 defines thickness 343. As shown in FIG. 5, thickness 343 is less than thickness 349. In a specific embodiment, heating element 342 is electrically coupled to a power supply via conductive connectors, such as conductive strips at a top and bottom of the lenses 340.

In a specific embodiment, body 348 is formed from a polycarbonate material. In a specific embodiment, first abrasion resistant coating 344 and/or second abrasion resistant coating 346 is a UV curable hard coat with silica, zirconia, and/or alumina nanoparticles.

In various embodiments, heating element 342 is formed from an optically clear (e.g., 90%+ light transmittance) resistive heating material. In a specific embodiment, heating element 342 is a polyester-based optically clear, resistive heating material.

In various embodiments, lenses 340 includes a body 348, a heating element 342, and a first abrasion resistant coating 344 formed from an abrasion resistant material. The heating element 342 is between the body 348 and the first abrasion resistant coating 344. In various embodiments, the first abrasion resistant coating 344 is facing away from the eye of the user (e.g., when the lens is being worn in front of the eye of the wearer). In various other embodiments, the first abrasion resistant coating 344 is facing towards the eye of the user (e.g., when the lens is being worn in front of the eye of the wearer). In various embodiments, lenses 340 includes a second abrasion resistant coating 346 opposite the first abrasion resistant coating 344, and the second abrasion resistant coating 346 is formed from the same abrasion resistant material as the first abrasion resistant coating 344.

Figure 6:
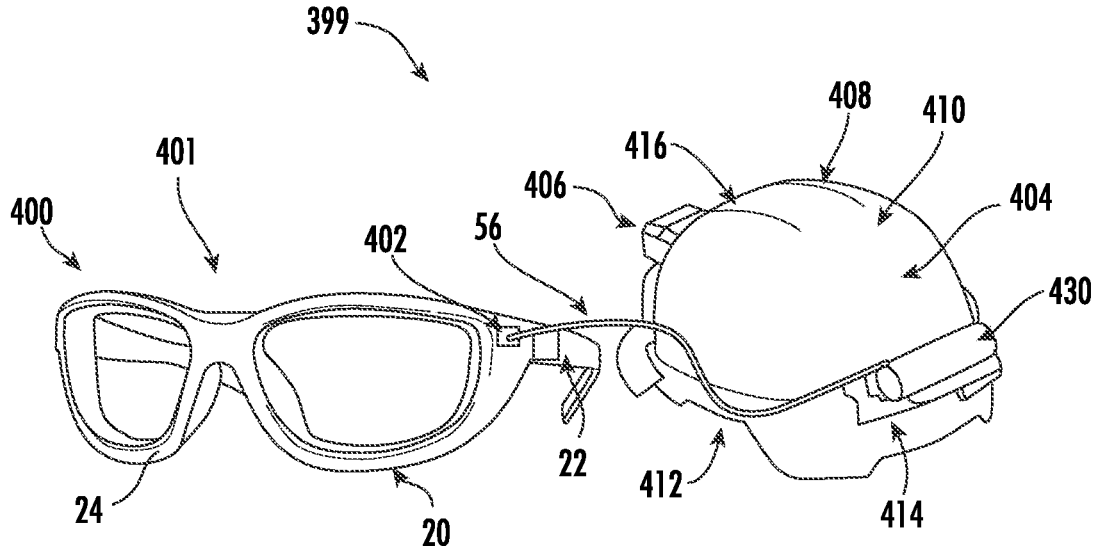
FIG. 6 is a perspective view of heated safety glasses and safety headwear, according to another exemplary embodiment.

Referring to FIG. 6, in various embodiments, heated safety glasses 400 are part of a work or protective system such as headwear protective system 399. In such embodiments, heated safety glasses 400 are configured to be coupled to a power supply 30 supported at a location separated from frame of the associated heated safety glasses. In various embodiments, headwear protective system 399 includes safety headwear, such as hardhat 404, power supply 430, and safety glasses 400, which includes frame 20, a lens and a heating element 401.

Power supply 430 is substantially the same as power supply 30 except for the differences discussed herein. In various embodiments, power supply 430 is a lithium ion battery and/or a rechargeable power tool battery (e.g., power supply 430 is a lithium ion rechargeable power tool battery).

Safety glasses 400 are substantially the same as the other embodiments of heated safety glasses (e.g., glasses 10) except for the differences discussed herein. For example, safety glasses 400 include a heating element 401 that is the same or similar as the heating element(s) of safety glasses 10 (e.g., heating element 50) and/or safety glasses 110 (e.g., heating element 142). Safety glasses 400 include an electrical input such as a power coupling port or connection, shown as port 402, supported by frame 20, to which a user may removably attach cord 56. Port 402 is physically coupled to frame 20 and electrically coupled to the heating element 401. In various embodiments cord 56 is coupled, such as physically coupled, to the power supply 430 and the heating element 401. Cord 56 in turn is electrically coupled to power supply 430 to deliver power to a heating element 401 as discussed herein. Stated another way, the heating element 401 is coupled to cord 56 and is configured to receive electricity from power supply 430 through cord 56. In one embodiment, port 402 is located on arm 22 of frame 20, and in another embodiment, port 402 is located on rim 24 of frame 20.

In the specific embodiment shown, power supply 430 is supported by a second piece of equipment, shown as hardhat 404. In such embodiments, the power conductor allows the user to provide power to glasses 400 as needed by connecting cord 56 to port 402. In this embodiment, power supply 430 may be used to power multiple components including glasses 400 and at least one more powered component, such as headlamp 406. In another embodiment, the second piece of equipment may be a heated article of clothing, such as a heated work jacket, and cord 56 connects glasses 400 to a power supply 30 coupled to the heating system of the article of clothing. In another embodiment, cord 56 may be connected to a power supply 430 carried elsewhere by a user such as in a pocket or tool belt of a user.

In various embodiments, hardhat 404 includes a shell 408 formed from a rigid material, shell 408 defining an external surface 410 and an opposing internal surface 412 that defines a cavity sized to receive the head of a user. In various embodiments, power supply 430 is physically coupled to hardhat 404, such as a rear 414 of hardhat 404. In various embodiments, hardhat 404 includes a lighting element (e.g., headlamp 406) coupled to a front 416 of hardhat 404 opposite rear 414, and the lighting element is also electrically coupled to power supply 430 such that the power supply 430 provides power to both the lighting element (e.g., headlamp 406) and the heating element 401.

In various embodiments a single battery powers both the lighting element (e.g., headlamp 406) and the heating element 401 of safety glasses 400. In various embodiments, the single battery is a rechargeable power tool battery. In various embodiments, the rechargeable power tool battery includes an interface that couples to a power tool (e.g., a power drill) to supply power to the power tool, and the interface alternatively couples to the headwear protective system 399, such as hardhat 404, to power the lighting element (e.g., headlamp 406) and/or the heating element 401 of safety glasses 400. In various embodiments, the rechargeable power tool battery is a lithium ion battery.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A safety eyewear comprising: a frame configured to couple to a head of a user; a lens coupled to the frame, wherein the lens is positioned in front of an eye of the user when the user is wearing the safety eyewear; and a heating element coupled to the frame, the heating element configured to convert received electricity into heat, wherein the heating element defines an elongate structure wrapped around the frame, wherein the heat transfers from the heating element to the lens to reduce fogging on the lens.

2. The safety eyewear of claim 1, comprising a power source physically coupled to the frame and electrically coupled to the heating element, the power source providing the electricity received by the heating element.

3. The safety eyewear of claim 1, comprising an electrical input electrically coupled to the heating element, the electrical input configured to receive the electricity and provide the electricity to the heating element.

4. The safety eyewear of claim 1, the heating element interfacing with each of the frame and the lens.

5. A safety eyewear comprising: a lens positioned in front of an eye of a user when the user is wearing the safety eyewear; a frame configured to couple to a head of the user, the frame comprising a rim coupled to the lens, a first arm coupled to the rim, and a second arm coupled to the rim, wherein the first and second arms are configured to engage with ears of the user to secure the safety eyewear to the head of the user; a power supply coupled to the first arm; and a heating element electrically coupled to the power supply, the heating element configured to convert electricity received from the power supply into heat, the heat transferring from the frame to the lens to increase a temperature of the lens to reduce fogging, wherein the heating element defines an elongate structure wrapped around the frame.

6. The safety eyewear of claim 5, wherein the first arm is pivotally coupled to the rim and the second arm is pivotally coupled to the rim.

7. The safety eyewear of claim 5, wherein the power supply comprises a rechargeable power tool battery.

8. The safety eyewear of claim 5, the heating element is formed from a plurality of elongate strips that extend across the lens.

9. A headwear protective system comprising: a safety headwear comprising a shell formed from a rigid material, the shell defining an external surface and an opposing internal surface that defines a cavity sized to receive the head of a user; a power supply coupled to the safety headwear; a frame configured to couple to the head of the user, the frame comprising a rim and a plurality of arms coupled to the rim and configured to engage with ears of the user to secure the frame to the head of the user; a lens coupled to the rim, wherein the lens is positioned in front of an eye of the user; a power conductor coupled to the power supply; and a heating element coupled to the power conductor and configured to receive electricity from the power supply through the power conductor and to convert the electricity into heat, wherein the heat transfers from the heating element to the lens to reduce fogging on the lens.

10. The headwear protective system of claim 9, the comprising an electrical input physically coupled to the frame and electrically coupled to the heating element, the electrical input configured to receive the electricity from the power supply.

11. The headwear protective system of claim 9, wherein the power supply is physically coupled to a rear of the safety headwear.

12. The headwear protective system of claim 11, comprising a lighting element physically coupled to a front of the safety headwear, wherein the lighting element is electrically coupled to the power supply such that the power supply provides power to both the lighting element and the heating element.

13. The headwear protective system of claim 9, the lens comprising a body, the heating element, and a first protective layer formed from an abrasion resistant material, the heating element between the body and the first protective layer, wherein the first protective layer is between 3 $\mu$m and 5 $\mu$m thick.

* * * * *